United States Patent
Kroth et al.

(10) Patent No.: US 8,885,604 B2
(45) Date of Patent: *Nov. 11, 2014

(54) METHOD FOR TRANSMITTING PACKET SWITCHED DATA IN A CELLULAR RADIO COMMUNICATON SYSTEM DURING CELL CHANGE

(75) Inventors: Norbert Kroth, Potsdam (DE); Jörg Schniedenharn, Bonn (DE)

(73) Assignee: Siemens Aktiengesellschaft, Munich (DE)

( * ) Notice: Subject to any disclaimer, the term of this patent is extended or adjusted under 35 U.S.C. 154(b) by 77 days.

This patent is subject to a terminal disclaimer.

(21) Appl. No.: 13/489,026

(22) Filed: Jun. 5, 2012

(65) Prior Publication Data
US 2012/0307753 A1 Dec. 6, 2012

Related U.S. Application Data

(63) Continuation of application No. 10/499,540, filed as application No. PCT/EP02/14914 on Dec. 20, 2002, now Pat. No. 8,213,380.

(30) Foreign Application Priority Data

Dec. 21, 2001 (EP) .................................. 01130732

(51) Int. Cl.
| | |
|---|---|
| *H04W 4/00* | (2009.01) |
| *H04W 36/02* | (2009.01) |
| *H04W 88/02* | (2009.01) |
| *H04W 36/08* | (2009.01) |
| *H04L 1/18* | (2006.01) |
| *H04W 16/24* | (2009.01) |

(52) U.S. Cl.
CPC .............. *H04W 36/02* (2013.01); *H04W 88/02* (2013.01); *H04W 36/08* (2013.01); *H04L 1/1809* (2013.01); *H04L 1/1874* (2013.01); *H04W 16/24* (2013.01)
USPC ............ 370/331; 370/469; 455/436; 714/748

(58) Field of Classification Search
CPC ........................................... H04L 1/18–1/1896

USPC ................... 370/331, 469; 455/436; 714/748
See application file for complete search history.

(56) References Cited

U.S. PATENT DOCUMENTS

| | | | |
|---|---|---|---|
| 5,570,367 | A | 10/1996 | Ayanoglu et al. |
| 5,729,541 | A | 3/1998 | Hamalainen et al. |

(Continued)

FOREIGN PATENT DOCUMENTS

| | | |
|---|---|---|
| DE | 19804185 A1 | 8/1999 |
| DE | 19849578 A1 | 1/2000 |

(Continued)

OTHER PUBLICATIONS

Computer Networks, Andrew S. Tannenbaum, p. 13, 2002.

(Continued)

*Primary Examiner* — Jeffrey M Rutkowski
(74) *Attorney, Agent, or Firm* — Staas & Halsey LLP

(57) ABSTRACT

A first base station associated with a first radio cell is used to transmit data packets in a second sequence to at least one subscriber station by at least one first radio channel. The subscriber station sorts out the received data packets into a first sequence in an intermediate storage unit and the base station associated with the first radio cell is used to derive and/or represent status information relating to the content of the intermediate storage unit in a status memory unit. Transmission of the data packets is relayed from the first to the second radio cell and data packets are transmitted by a base station associated with the second radio cell to the subscriber station by at least one other radio channel. The status information is transferred from the base station associated with the first radio cell to the base station associated with the second radio cell.

1 Claim, 2 Drawing Sheets

(56) References Cited

U.S. PATENT DOCUMENTS

| | | | |
|---|---|---|---|
| 5,896,373 | A | 4/1999 | Mitts et al. |
| 6,301,479 | B1 | 10/2001 | Roobol et al. |
| 6,816,471 | B1 * | 11/2004 | Ludwig et al. ............... 370/331 |
| 7,209,437 | B1 | 4/2007 | Hodgkinson et al. |
| 7,286,563 | B2 * | 10/2007 | Chang et al. ............... 370/469 |
| 8,213,380 | B2 * | 7/2012 | Kroth et al. ............... 370/331 |
| 2002/0172208 | A1 * | 11/2002 | Malkamaki ............... 370/400 |
| 2004/0146033 | A1 * | 7/2004 | Soderstrom et al. ........... 370/338 |
| 2004/0246917 | A1 * | 12/2004 | Cheng et al. ............... 370/328 |

FOREIGN PATENT DOCUMENTS

| | | |
|---|---|---|
| EP | 0695053 A2 | 1/1996 |
| EP | 0 777 396 A1 | 6/1997 |
| EP | 0869629 A1 | 10/1998 |
| EP | 1220490 A1 | 7/2002 |
| WO | WO00/44191 | 7/2000 |
| WO | WO02/47317 A1 | 6/2002 |

OTHER PUBLICATIONS

Office Action mailed from the Unites States Patent and Trademark Office on Aug. 2, 2007 in the related U.S. Appl. No. 10/499,540.
Office Action mailed from the Unites States Patent and Trademark Office on Feb. 20, 2008 in the related U.S. Appl. No. 10/499,540.
Advisory Action mailed from the Unites States Patent and Trademark Office on Jun. 12, 2008 in the related U.S. Appl. No. 10/499,540.
Communication mailed from the Unites States Patent and Trademark Office on Jan. 27, 2009 in the related U.S. Appl. No. 10/499,540.
Communication mailed from the Unites States Patent and Trademark Office on Apr. 27, 2009 in the related U.S. Appl. No. 10/499,540.
Communication mailed from the Unites States Patent and Trademark Office on Jun. 9, 2009 in the related U.S. Appl. No. 10/499,540.
Communication mailed from the Unites States Patent and Trademark Office on Dec. 23, 2011 in the related U.S. Appl. No. 10/499,540.
Notice of Allowance mailed from the Unites States Patent and Trademark Office on Mar. 2, 2012 in the related U.S. Appl. No. 10/499,540.
U.S. Appl. No. 10/499,540, filed Jun. 21, 2004, Norbert Kroth et al., Siemens Aktiengesellschaft.

* cited by examiner

METHOD FOR TRANSMITTING PACKET SWITCHED DATA IN A CELLULAR RADIO COMMUNICATON SYSTEM DURING CELL CHANGE

CROSS REFERENCE TO RELATED APPLICATIONS

This application is a continuation of and claims priority benefit to U.S. patent application Ser. No. 10/499,540, filed Jun. 21, 2004, now U.S. Pat. No. 8,213,380 allowed, which application in turn is based on and claims priority to PCT Application No. PCT/EP02/14914 filed on Dec. 20, 2002 and European Application No. 01130732.9 filed on Dec. 21, 2001, the contents of which are hereby incorporated by reference.

BACKGROUND OF THE INVENTION

The invention relates to a method for packet switched transmission of data packets containing useful information and sorted into a first sequence in a cellular radio communication system.

The invention further relates to a radio communication system for packet switched transmission of data packets containing useful information and sorted into a first sequence.

Radio communication systems are increasingly gaining significance both in the business sector and among consumers. In radio communication systems, information such as speech, pictures or other data is transmitted between a base station and a subscriber station, in particular a mobile station, over a radio interface with the aid of electromagnetic waves. The electromagnetic waves are emitted on carrier frequencies that lie within the intended frequency band for the system concerned. For future mobile radio systems the radio interface is sub-divided into transmission channels according to the TD/CDMA transmission method or the FD/CDMA transmission method so that the channels separate the radio resources of the radio interface between the individual subscriber stations. For UMTS (universal mobile telecommunication system) or other third generation systems, the frequencies planned for the transmission channels are typically in the frequency band of around 2000 MHz.

For the above-mentioned UMTS radio communication system there is a distinction between modes known as the FDD mode (frequency division duplex) and the TDD mode (time division duplex). The TDD mode is distinguished in particular by the fact that a common frequency band is used for data transmission in both the upward direction (UL uplink) and the downward direction (DL downlink), whereas the FDD mode uses a different frequency band for each of the two transmission directions.

In order to transmit data between a base station and a subscriber station it is possible to use on the one hand methods based on connection-oriented concepts, and on the other hand methods based on logical connections. In the case of connection-oriented data transmission, physical resources of the radio interface must be made available throughout the entire data transmission time. In the case of data transmission via logical connections, there is no need for physical resources to be permanently provided.

An example of data transmission via logical connections is data transmission by data packets. In this case a logical connection exists between the base station and the subscriber station throughout the duration of the entire transmission, but physical resources are provided only during the actual transmission times of the data packets. This method is based on the fact that the data is transmitted in short data packets, between which quite long pauses can occur. In the pauses between the data packets, the physical resources are available for other logical connections. Physical resources are saved compared to a logical connection.

SUMMARY

Data packets containing useful information are transmitted in a cellular radio communication system in such a way that a base station associated with a first radio cell is used to at least partially transmit data packets in a second sequence to at least one subscriber station via at least one first radio channel. The at least one subscriber station sorts the received data packets into a first sequence in an intermediate storage unit and the base station associated with the first radio cell is used to derive and/or represent at least one item of status information relating to the content of the intermediate storage unit of the at least one subscriber station in a status memory unit.

In the context of the ISO/OSI reference model the base station includes the functions of the physical layer only, that is, functions that affect the bit transmission layer. Functionalities of higher-level layers, such as error-handling methods of the link layer control or switching functions of the network layer, are not executed in the base station, but in downstream units of the radio network subsystem such as the radio network controller.

One possible object of the invention is to demonstrate a method and a radio communication system of the kind initially set out above which enables efficient transmission of the data packets in the radio communication system during cell change. In particular every effort is made to use the physical radio resources as efficiently as possible for the lowest possible management overhead in the radio network subsystem.

The inventors propose that transmission of the data packets is relayed from the first to the second radio cell and data packets are transmitted by a base station associated with the second radio cell to the at least one subscriber station by at least one other radio channel. The status information is transferred from the base station associated with the first radio cell to the base station associated with the second radio cell.

This method significantly expands the area of responsibility of the base stations. According to previously known methods, base stations were restricted to methods within the physical layer of the protocol stack in the ISO/OSI reference model. The management of data packets once they were transmitted was not the responsibility of the base stations. In the event of a cell change, status information was rejected and data packets that were in the intermediate storage unit had to be retransmitted by the base station of the destination radio cell. According to the method, it is now possible for data packets in the intermediate storage unit not to need retransmission, even during a cell change. Since status information is forwarded by the first radio cell to the second radio cell—the destination radio cell—all status information is present in the destination radio cell, and it is therefore possible to continue with the regular transmission of data packets without any delay and without repeating data packets already sent to the subscriber station. As a result data packets are efficiently transmitted even in the case of a cell change and the physical resources of the radio interface are not burdened with the retransmission of data packets. Within the scope of this method, sorting the sequence of data packets refers to both the number of data packets sent and to the order of the data packets within a series. With reference to the first and second sequences, corresponding to the sequences of the transmitted and received data packets, it is possible that both sequences may be configured differently. In practice this is the case that occurs the most frequently. But it is also possible for both sequences to be identical.

In an embodiment the base station associated with the first radio cell and the base station associated with the second radio cell are identical and status information is transferred internally within the base station. This is a particularly efficient application, since the status information is transferred "by the shortest route". The base station is associated with logically different radio cells or cell sectors and manages these radio cells independently of one another. If the subscriber station changes from one cell sector to the neighbouring cell sector of the same base station, the status information has to be transferred between logically independent cell sector management units. In so doing the management overhead incurred by the total radio communication system in respect of status information is minimal.

In a further embodiment the status information is transferred between the base station associated with the first radio cell and the base station associated with the second radio cell by a base station network. The object of the radio communication systems is to impose the smallest possible load on the physical interface, that is, the radio interface. If the status information is rejected during a cell change, the data packets have to be conventionally retransmitted. This gives rise to an additional loading on the radio interface. But advantageously, transferring the status information over the base station network removes a burden from the radio interface and leads to a better and more effective use of the radio resources.

In a further embodiment the status information is transferred to the base station associated with the second radio cell by the at least one subscriber station. As a rule the content of the status information is smaller than the content of the data packets in the intermediate storage unit, so that transferring the status information via the radio channel places a smaller load on the radio resources than retransmitting the data packets. This method, too, makes better use of the radio resources than is the case when retransmitting the data packets according to the related art.

In a further embodiment the status memory unit in the base station associated with the second radio cell and the intermediate storage unit in the at least one subscriber station are cleared and/or reinitialized. The data packets held in the intermediate storage unit of the at least one subscriber station are retransmitted by the base station associated with the second radio cell.

This ensures that the data packets in the intermediate storage unit are not lost.

In a further embodiment the status information in the base station associated with the second radio cell is reinitialized and the data packets in the intermediate storage unit of the at least one subscriber station are forwarded to a link layer control downstream of the intermediate storage unit, in particular the RLC layer (radio link control), for further processing. This method ensures that the radio interface is not loaded down with retransmitting all the data packets in the intermediate storage unit. Error correction methods which detect incorrectly transmitted data packets are carried out in the link layer control downstream of the intermediate storage unit. It is possible to ensure that only the defective data packets are retransmitted at the request of this layer. By making full use of the error correction methods of the downstream link layer control it is possible to reduce the number of data packets to be retransmitted and thereby use the radio resources efficiently.

In a further embodiment the base station associated with the first radio cell and/or the base station associated with the second radio cell evaluate the status information from the intermediate storage unit and in the event that data packets have been transmitted incorrectly, the defective data packets are retransmitted. This method makes it possible to use error correction methods in the base station itself at the level of the physical layer in the protocol stack. This approach minimizes the management overhead throughout the entire radio communication system. ARQ methods (automatic repeat request) are especially suitable for error correction purposes.

In a further embodiment the data packets in the intermediate storage unit of the at least one subscriber station are forwarded to a link layer control downstream of the intermediate storage unit, in particular the radio link control layer, for further processing. In this link layer control the data packets are reprocessed using in particular error correction methods, preferably together with ARQ methods. Using this method both in the physical layer based on intermediate storage and in the link layer control makes a two-stage error correction method possible: stage one under the responsibility of the base station and stage two under the responsibility of a network controller.

The at least one and/or the further radio channel can be an HSDPA (high speed downlink packet access) radio channel specified according to the UMTS standard. In particular the radio channel, according to the document R2-012001, "UTRA High Speed Downlink Packet Access (Release 5)", Technical Specification Group Radio Access Network, 3rd Generation Partnership Project (3GPP), can be a currently planned HSDPA radio channel (high speed downlink packet access) used in a radio communication system operating according to the UMTS standard.

With regard to the radio communication system, the above-mentioned object may be achieved by a radio communication system.

The radio communication system includes a relay unit to relay the transmission of data packets from the first radio cell to a second radio cell, and one of the base stations associated with the second radio cell includes a transmitter unit to transmit data packets to the at least one subscriber station via at least one other radio channel. Units also exist for transferring the status information from the base station associated with the first radio cell to the base station associated with the second radio cell.

The base station and subscriber station components of a radio communication system are particularly significant.

The base station includes at least a unit for arranging data packets sorted in a first sequence into a second sequence and/or a unit for at least partially transmitting data packets in the second sequence to at least one subscriber station via at least one first radio channel and a unit for deriving and/or representing status information relating to the content of the intermediate storage unit of the at least one subscriber station in a status memory unit.

The subscriber station is designed to include an intermediate storage unit for received data packets and a sorting unit to sort the data packets received in an intermediate storage unit into the first sequence.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
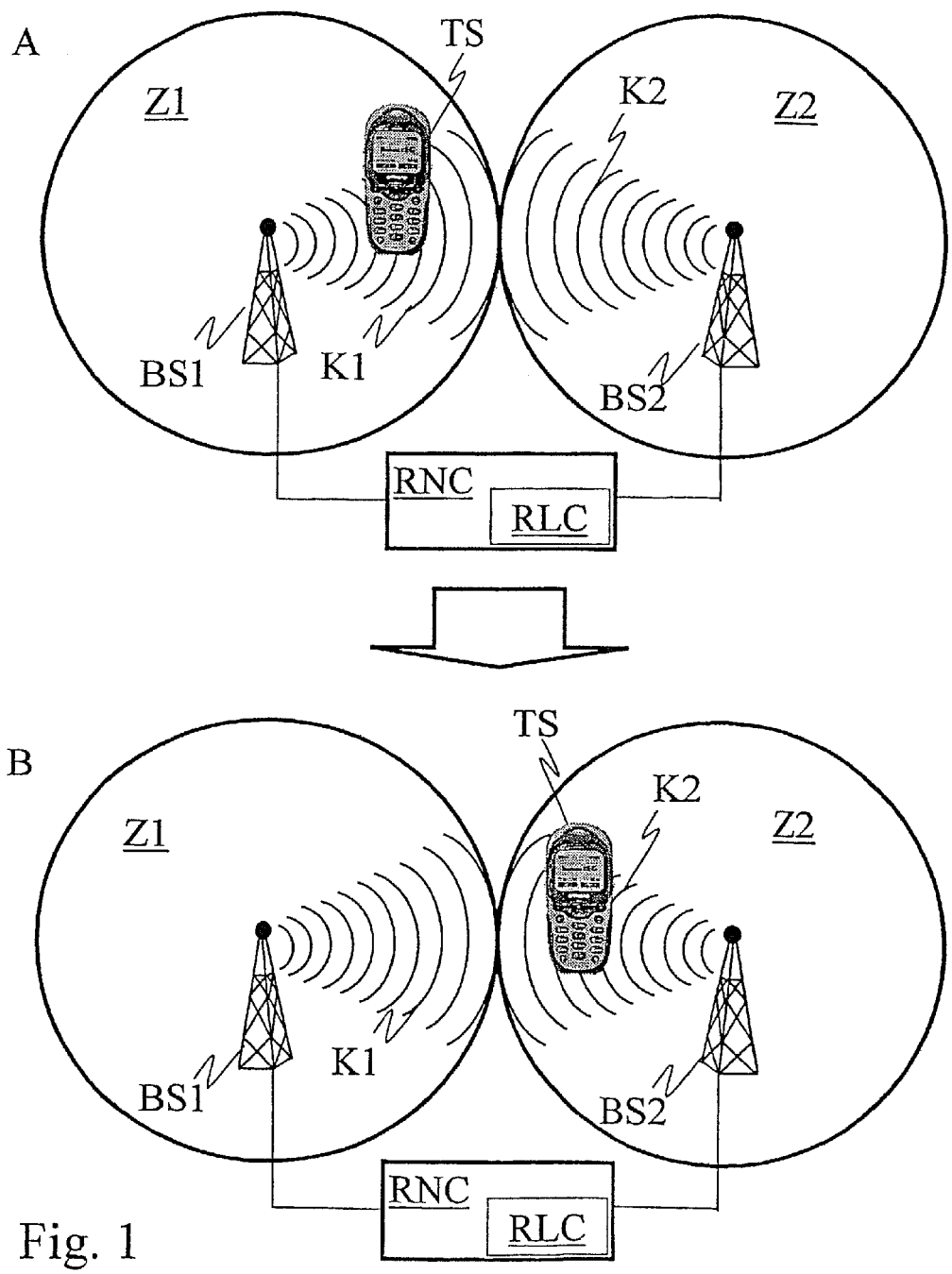
FIG. 1 is a diagram of a radio communication system for transmitting packet switched data during cell change.

Reference will now be made in detail to the preferred embodiments of the present invention, examples of which are illustrated in the accompanying drawings, wherein like reference numerals refer to like elements throughout.

FIG. 1 illustrates the functional structure of a radio subsystem in a radio communication system. This radio subsystem includes a radio network controller RNC and two base stations BS1 and BS2. The base stations BS1 and BS2 are logical units which are responsible for the radio transmission K1 and K2 in the radio cells Z1 and Z2 and which communicate with the radio network controller RNC over an interface. With regard to the ISO/OSI reference model, the base stations BS1 and BS2 support only the physical layer of the protocol stack for the subscriber station TS, whereas the radio network controller RNC also includes the bit transmission layer, the link layer control and the network layer of the protocol stack. The link layer control is then subdivided into the sub-layers MAC (medium access control), RLC (radio link control), PDCP (packet data convergence protocol) and BMC (broadcast/multicast control).

There are two main approaches to error handling during packet switched data transmission—the forward error correction method and the ARQ method (automatic repeat request). In the ARQ method, corrupted data packets are not corrected by the receiver and then accepted, as in the forward error correction method, but instead are checked for correctness with the aid of an error-detecting code and additional corrections in appropriate cases. In the ARQ method, if a data packet is detected as incorrect, a request is issued in the receiver for that data packet to be sent again by the transmitter.

This ARQ method requires a return channel between the transmitter and the receiver via which the results of the error evaluation are notified to the transmitter by an acknowledgement. For this purpose all data packets being transmitted are provided with a sequence number, thus defining the first sequence in the transmitter. A positive acknowledgement is sent for a correctly received data packet. If the incoming data packet is defective, a negative acknowledgement is sent together with a request for it to be retransmitted. As a rule the data packet has a specific structure for the ARQ method.

For the sake of making effective use of the radio resources and providing an effective version of the ARQ method, the incoming data packets are sorted in an intermediate storage unit in the subscriber station TS into the first sequence, i.e. according to the sequence number of the data packets being transmitted. Sorting the data packets as early as the physical layer simplifies not only further processing of the data packets in higher layers but also the ARQ method itself. Furthermore the base station BS1 associated with the radio cell Z1 derives and/or represents at least one item of status information relating to the content of the intermediate storage unit of subscriber station TS in a status memory unit. The base station BS1 must hold the status information about the transmitted data packets in the status memory unit until they have been reported as received without error by the subscriber station TS.

By managing the data packets in the base station BS1 and the subscriber station TS in this way it is possible to execute the ARQ method in a first step within the physical layer of the protocol stack for the base station BS1 and the subscriber station TS.

In the event of a cell change the problem exists that the status information in the destination cell Z2 with the base station BS2 is unknown. Transmission of the data packets is relayed from the first radio cell Z1 with the associated base station BS1 to the second radio cell Z2 with the base station BS2, the status information regarding the incoming data packets being relayed by the base station BS1 associated with the first radio cell Z1 to the base station Z2 associated with the second radio cell Z2.

The following options are proposed for transferring the status information from the first radio cell Z1 to second radio cell Z2.

In the first option the status information can be transferred between the base station BS1 associated with the first radio cell Z1 and the base station BS2 associated with the second radio cell Z2 by a base station network corresponding to the radio network controller RNC in FIG. 1.

In the second option the status information can be transferred to the base station BS2 associated with the second radio cell Z2 by the subscriber station TS. In the main this information is transmitted between the subscriber station TS and the base station BS2 via the radio channel K2.

A third option is that the status memory unit in the base station BS2 associated with the second radio cell Z2 and the intermediate storage unit in the subscriber station TS are cleared and/or reinitialized. For the ARQ method on the basis of the physical protocol stack layer, this means that the data packets held in the intermediate storage unit must be retransmitted by the base station BS2 associated with the second radio cell Z2.

A fourth option exists in which the status information in the base station BS2 associated with the second radio cell Z2 is reinitialized and the data packets in the intermediate storage unit of the subscriber station TS are forwarded to higher protocol layers, in particular the RLC sub-layer of the link layer control, for further processing. In this case there is no ARQ method in the physical layer of the base stations BS1 and BS2.

Figure 2:
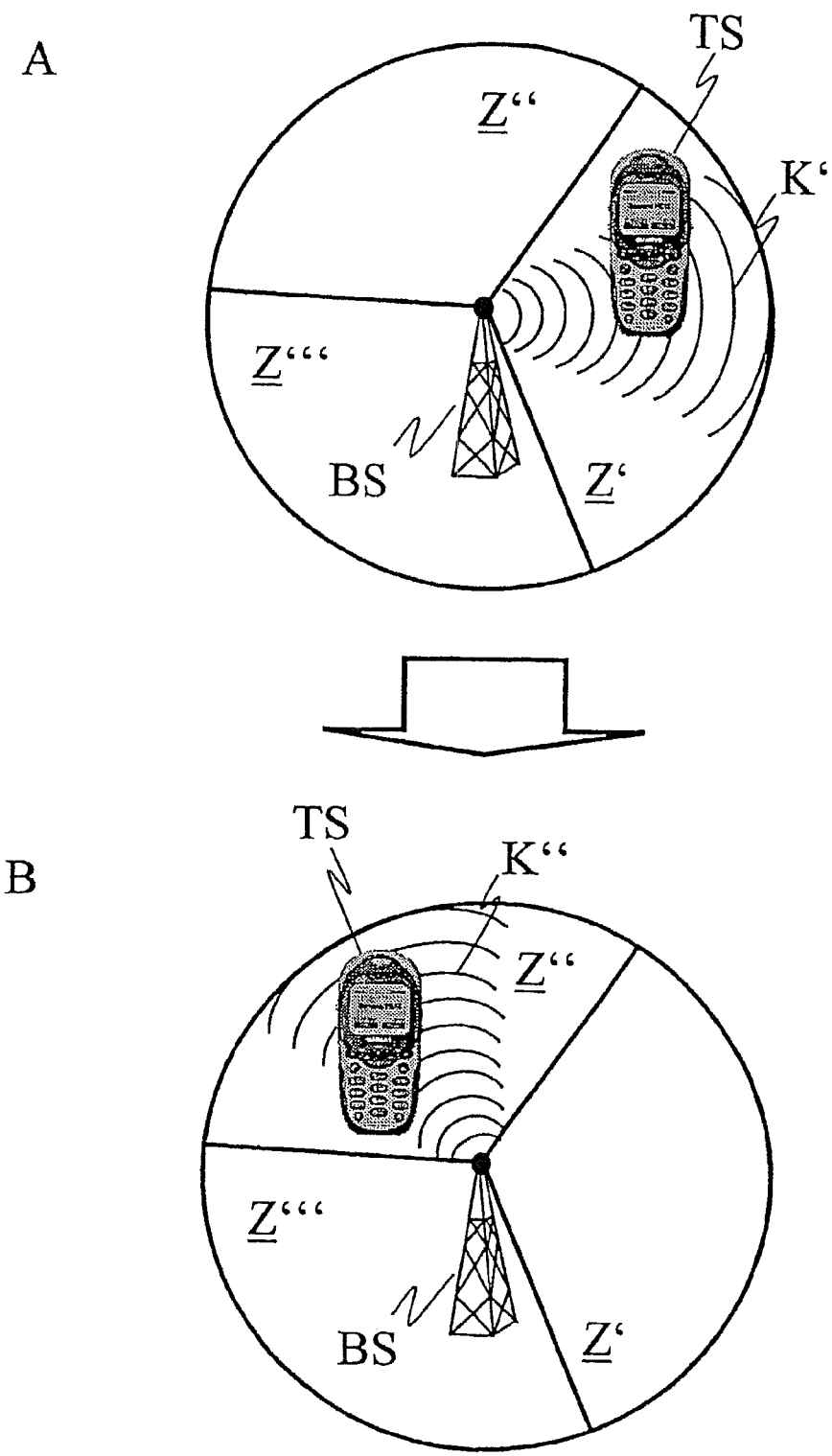
FIG. 2 is a diagram of a radio communication system for transmitting packet switched data during cell sector change.

A further and particularly efficient option for transferring the status information from the base station BS1 to the base station BS2 is the embodiment shown as an example in FIG. 2. The status information need not be transferred from the base station BS associated with the first radio cell Z' to the base station BS associated with the second radio cell Z" by external transmission equipment if the base station BS associated with the first radio cell Z' and the base station BS2 associated with the second radio cell Z" are identical. In this case the status information can be transferred internally within the base station. In the typical embodiment shown, the radio cell is divided into three cell sectors Z', Z" and Z'". The base station BS is physically allocated to all three cell sectors Z', Z" and Z'", the three cell sectors being managed independently of each other internally within the base station BS. In the context of this independent cell-sector management the status information is transferred by the management unit for cell sectors Z' and Z".

As the typical embodiments have shown, the method makes it possible to execute an ARQ method in a first step within the physical layer of the protocol stack. The base station BS1 associated with the first radio cell Z1 and/or the base station BS2 associated with the second radio cell Z2 evaluate the status information as early as the physical layer itself. In the event that data packets have been transmitted incorrectly, the defective data packets have to be retransmitted.

It is further possible for the data packets from the intermediate storage unit of the at least one subscriber station TS to be forwarded to the link layer control RLC in the protocol stack, downstream of the intermediate storage unit. In this link layer control the data packets are reprocessed and in particular an ARQ method is applied again in the RLC layer. This is the second step in the ARQ method. This second step in the ARQ method takes place in the radio network controller RNC away from the base stations BS1 and BS2.

The described method is used with particular advantage on radio channels which are specified as HSDPA (high speed downlink packet access) radio channels according to the UMTS standard.

The invention has been described in detail with particular reference to preferred embodiments thereof and examples, but it will be understood that variations and modifications can be effected within the spirit and scope of the invention.

What is claimed is:

1. A subscriber station comprising:
    an intermediate storage unit to store received data packets; and
    a processor configured to apply an ARQ method to the received data packets in a physical layer and to subsequently forward the data packets to a higher layer for further processing, wherein
    when the subscriber station moves from a first radio cell to a second radio cell, the processor forwards the data packets in the intermediate storage unit of the subscriber station to the higher layer for further processing without further applying the ARQ method in the physical layer.

* * * * *